United States Patent
Kiuchi et al.

(10) Patent No.: US 9,550,876 B2
(45) Date of Patent: Jan. 24, 2017

(54) POLYLACTIC ACID RESIN COMPOSITION AND POLYLACTIC ACID RESIN MOLDED BODY

(75) Inventors: Yukihiro Kiuchi, Minato-ku (JP); Tsunenori Yanagisawa, Minato-ku (JP); Masatoshi Iji, Minato-ku (JP); Kazuhiko Inoue, Minato-ku (JP); Shin Serizawa, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/003,263

(22) PCT Filed: Apr. 16, 2009

(86) PCT No.: PCT/JP2009/057699
§ 371 (c)(1),
(2), (4) Date: Jan. 7, 2011

(87) PCT Pub. No.: WO2010/004799
PCT Pub. Date: Jan. 14, 2010

(65) Prior Publication Data
US 2011/0118395 A1    May 19, 2011

(30) Foreign Application Priority Data

Jul. 10, 2008  (JP) ................. 2008-180139

(51) Int. Cl.
*C08K 3/22* (2006.01)
*C08K 5/5399* (2006.01)
*C08K 13/02* (2006.01)

(52) U.S. Cl.
CPC ............ *C08K 3/22* (2013.01); *C08K 5/5399* (2013.01); *C08K 13/02* (2013.01)

(58) Field of Classification Search
CPC .................................................. C08K 13/02
USPC ....................................................... 524/116
See application file for complete search history.

(56) References Cited

U.S. PATENT DOCUMENTS

| | | | |
|---|---|---|---|
| 2004/0039134 A1* | 2/2004 | Murakami et al. | 525/410 |
| 2004/0157967 A1* | 8/2004 | Ito | C08K 5/527 524/109 |
| 2005/0143502 A1* | 6/2005 | Yamada | C08K 5/0008 524/115 |
| 2005/0165142 A1* | 7/2005 | Nishimura et al. | 524/210 |
| 2008/0071015 A1* | 3/2008 | Kiuchi et al. | 524/261 |

FOREIGN PATENT DOCUMENTS

| | | |
|---|---|---|
| EP | 2264103 A1 | 12/2010 |
| JP | 08-252823 A | 10/1996 |
| JP | 2004-190025 A | 7/2004 |
| JP | 2004-263180 A | 9/2004 |
| JP | 2005-162871 A | 6/2005 |
| JP | 2005-163476 A | 6/2005 |
| JP | 2005-248032 A | 9/2005 |
| JP | 2006-008731 A | 1/2006 |
| JP | 2006-143884 A | 6/2006 |
| JP | 2007-126520 A | 5/2007 |
| JP | 2008-045045 A | 2/2008 |
| JP | 2008-088226 A | 4/2008 |
| WO | 2005/061626 A1 | 7/2005 |

OTHER PUBLICATIONS

Communication dated Jan. 22, 2015 from the European Patent Office in counterpart application No. 09794246.0.

* cited by examiner

*Primary Examiner* — Doris Lee
(74) *Attorney, Agent, or Firm* — Sughrue Mion, PLLC

(57) ABSTRACT

Disclosed is a polylactic acid resin composition having excellent bleed resistance and molecular weight retention ratio. A polylactic acid resin molded body is also disclosed. The polylactic acid resin composition contains a polylactic acid resin (a), a metal hydrate (b) having an alkali metal-containing substance content of not more than 0.2% by mass, and a phosphazene derivative (c). The polylactic acid resin molded body is obtained by molding the polylactic acid resin composition. Specifically, a polylactic acid molded body can be produced by filling a melt of the polylactic acid resin composition into a mold at a temperature in the range from glass transition temperature of said polylactic acid resin (a) to 110° C. and molding the melt therein.

14 Claims, No Drawings

POLYLACTIC ACID RESIN COMPOSITION AND POLYLACTIC ACID RESIN MOLDED BODY

CROSS REFERENCE TO RELATED APPLICATION

This application is a National Stage of International Application No. PCT/JP2009/057699filed Apr. 16, 2009, claiming priority based on Japanese Patent Application No. 2008-180139, filed Jul. 10, 2008, the contents of all of which are incorporated herein by reference in their entirety.

FIELD OF THE INVENTION

This invention relates to a polylactic acid resin composition and a polylactic acid resin molded body.

DESCRIPTION OF THE RELATED ART

A polylactic acid resin has the following features, thus currently its use is attend to: (i) A large amount of L-lactic acid is manufactured at a low cost by fermentation from sugars which are obtained from corn, potato, or the like; (ii) Since raw materials are natural agricultural products, the generation of greenhouse gases which largely contribute to global warming in manufacturing processes is lower than resins derived from petroleum materials; (iii) The obtained resins have high rigidity and good transparency. However, since polylactic acid resins are easily burned, it was difficult to use them in applications such as cases for appliances or OA devices or parts for machines or automobiles which need high fire retardancy.

The polylactic acid resin compositions having good fire retardancy which have been obtained by adding additionally phosphorous compounds with metal hydrates including aluminum hydroxide in a polylactic acid resin have been disclosed in Patent documents 1-6.

PRIOR-ART DOCUMENTS

Patent document 1: JP 2005-162871 A
Patent document 2: JP 2006-143884 A
Patent document 3: JP 2005-248032 A
Patent document 4: JP 2006-8731 A
Patent document 5: JP 2004-190025 A
Patent document 6: WO 2005/061626

SUMMARY

However, the content of alkali metal-containing substance in metal hydrates illustrated by Patent documents 1~5 was not specified. Therefore, when metal hydrates illustrated in Patent documents 1~5 are used together with common phosphorous compounds such as aromatic phosphoric esters, since the concentration of alkali metal-containing substance in these metal hydrates is high, the hydrolysis of phosphorous compounds is promoted by the alkali metal-containing substance. Although the content of alkali metal-containing substance in metal hydrates illustrated in Patent document 6 is not more than 0.2% by mass, common phosphorous compounds are just disclosed therein, therefore hydrolysis of phosphorous compounds could not be inhibited. As a result, there have been problems that phosphorous compounds or decomposed products therefrom may be easily bled from an original material, that is, polylactic acid, or the decomposition of polylactic acid may be accelerated to result in the lowering of molecular weight.

The object of this invention is to provide a polylactic acid resin composition and a polylactic acid resin molded body, which have excellent bleed-resistance and molecular weight retention rate.

This invention provides a polylactic acid resin composition containing a polylactic acid resin (a), a metal hydrate (b) having an alkali metal-containing substance content of not more than 0.2% by mass, and a phosphazene derivative (c); and a polylactic acid resin molded body formed by molding said polylactic acid resin composition.

According to this invention, the polylactic acid resin composition and the polylactic acid resin molded body having excellent bleed-resistance and molecular weight retention rate while exhibiting good fire retardancy can be provided.

DETAILED DESCRIPTION OF THE PREFERRED EMBODIMENTS

<Polylactic Acid Resin Composition>

According to this invention, a polylactic acid resin composition contains a polylactic acid resin (a), a metal hydrate (b) having an alkali metal-containing substance content of not more than 0.2% by mass, and a phosphazene derivative (c), thus having an effect of exhibiting excellent bleed-resistance and molecular weight retention rate. However the reason has not yet been determined, the following descriptions may be considered as a reason of the effect. If a common phosphorous compound other than a phosphazene derivative is combined with a common metal hydrate having a high content of alkali metal-containing substance, hydrolysis of the phosphorous compound itself, especially phosphoric ester compound is promoted by the alkali metal-containing substance. Phosphorous compounds or decomposed products therefrom lead to problems that these are easily bled from a polylactic acid, or the decomposition of polylactic acid is accelerated to result in the lowering of molecular weight of polylactic acid itself. On the contrary, it may be believed that in this invention, the bleed of phosphorous compounds from a polylactic acid or the decomposition of polylactic acid could be inhibited by using the combination of a metal hydrate (b) having an alkali metal-containing substance content of not more than 0.2% by mass and a phosphazene derivative (c), as described in this invention.

[Polylactic Acid Resin (a)]

According to this invention, as the polylactic acid resin (a), polylactic acids or copolymers of lactic acids and hydroxycarboxylic acids other than lactic acid may be used. The polylactic acid resin (a) may be used only a resin or in a combination of two or more resins.

The polylactic acid may be a homopolymer of L-lactic acid or a homopolymer of D-lactic acid, or a copolymer of L-lactic acid and D-lactic acid. The copolymer of L-lactic acid and D-lactic acid is comprised of, for example, 20-100 mol % of L-lactic acid units or D-lactic acid units and 0-80 mol % of the corresponding antipode (optical isomer) units. Also, stereo-complex polylactic acids, which are comprised of the mixture of a polylactic acid (A) consisting of 90-100 mol % of L-lactic acid units and 0-10 mol % of D-lactic acid units and a polylactic acid (B) consisting of 90-100 mol % of D-lactic acid units and 0-10 mol % of L-lactic acid units and have (A)/(B) (a mass ratio) of 10/90-90/10, may be used. Copolymeric components other than lactic acid in each polylactic acid (A) and (B) constituting a stereo-complex polylactic acid include dicarboxylic acid, polyhydric alcohol, hydroxycarboxylic acid, lactone, or the like, which has two or more functional groups each capable of forming a ester bonding. These are, for example, polyester, polyether, polycarbonate, or the like which have the two or more unreacted functional groups in a molecular.

The copolymers of lactic acids and hydroxycarboxylic acids other than lactic acids include, for example, copolymers which are comprised of 85 mol % or more and less than 100 mol % of units of L-lactic acid and/or D-lactic acid and more than 0 mol % and less than 15 mol % of units of hydroxycarboxylic acids other than lactic acids. The hydroxycarboxylic acids include glycolic acid, hydroxybutyric acid, hydroxyvaleric acid, hydroxypentanoic acid, hydroxycaproic acid, hydroxyheptanoic acid, or the like. Glycolic acid or hydroxycaproic acid is preferred.

The polylactic acid resins can be obtained by dehydration polycondensation of raw materials having desired structures, which are selected from L-lactic acid, D-lactic acid, and hydroxycarboxylic acids other than lactic acids. Also, they can be obtained by ring-opening polymerization of raw materials having desired structures, which are selected from lactides which are cyclic dimer of lactic acids, glycolide which is a cyclic dimer of glycolic acids, caprolactone, or the like. The lactides include L-lactide which is a cyclic dimer of L-lactic acids, D-lactide which is a clyclic dimer of D-lactic acids, mesolactide which is a cyclic dimer of L-lactic acid and D-lactic acid, or DL-lactide which is a racemic mixture of D-lactide and L-lactide. Any lactide may be used. Preferably, D-lactide or L-lactide is a main component.

A polylactic acid resin (a) may be a crystalline polylactic acid having 90% or more of optical purity, or may be a mixture of a crystalline polylactic acid having 90% or more of optical purity and a crystalline polylactic acid having less than 90% of optical purity. For heat-resistance, a ratio of the crystalline polylactic acid having 90% or more of optical purity to the crystalline polylactic acid having less than 90% of optical purity, that is, (crystalline polylactic acid having 90% or more of optical purity)/(crystalline polylactic acid having less than 90% of optical purity) is preferably 100/0-10/90, more preferably 100/0-25/70, even more preferably 100/0-50/50, and most preferably 100/0-90/10, as a mass ratio.

Commercially available polylactic acid resins include the trade name "LACEA" by Mitsui Chemicals, Inc.; the trade name "Nature Works" by Nature works LLC; the trade name "eco-plastic U' z" by Toyota Motor Corp.; the trade name "TERRAIVIAC" by Unitika, Ltd.; or the like. Among these, "LACEA H-100", "LACEA H-280", "LACEAH-400", "LACEA H-440", "Nature Works", "eco-plastic U'z", "THERAMAC TE-2000" or "THERAMAC TP-4000" are preferred.

For heat-resistance, crystalline polylactic acid resins having a high purity of L-lactic acid are preferred, and they are preferably orientated and crystallized by extension. The crystalline polylactic acid resins include "LACEAH-100", "LACEA H-400", "LACEA H-440" by Mitsui Chemicals, Inc.; or "eco-plastic U'z S-09", "eco-plastic U'z S-12", "eco-plastic U'z S-17" by Toyota Motor Corp.; or the like.

In order to meet good strength and rigidity, a weight-average molecular weight of polylactic acid resin (a) is preferably 50,000 or more, more preferably 100,000 or more.

In order to achieve the object of this invention, a content of polylactic acid resin (a) in the polylactic acid resin composition is preferably 30% by mass or more and 80% by mass or less, more preferably 40% by mass or more and 60% by mass or less.

[Metal Hydrate (b) Having an Alkali Metal-Containing Substance Content of not More than 0.2% by Mass]

According to this invention, in order to inhibit the hydrolysis of polylactic acid resin or phosphorous compound, a metal hydrate (b) having an alkali metal-containing substance content of not more than 0.2% by mass is used. The metal hydrate (b) includes aluminum hydroxide, magnesium hydroxide, dawsonite, calcium aluminate hydrate, hydrated gypsum, calcium hydroxide, zinc borate, barium borate, borax, kaolinite, or the like. Among these, one or more selected from aluminum hydroxide, magnesium hydroxide and calcium hydroxide be preferred, and aluminum hydroxide is more preferred.

The alkali metal-containing substance contained in the metal hydrate (b) includes oxides or chlorides salts of lithium, sodium, potassium, beryllium, magnesium, calcium, strontium, or barium. A content of alkali metal-containing substance may be measured by an atomic absorption or an ICP emission-spectrophotometry method.

Preferably, the metal hydrate (b) is comprised of particles having an average particle size of not more than 10 μm, more preferably an average particle size of 0.1-5 μm. The average particle size of metal hydrate (b) may be determined by measuring a volume median diameter by a diffraction/scattering method. Commercially available apparatuses include SALD-3100 (trade name of SHIMADZU CORPORATION), which is a laser diffraction-type particle size distribution measuring device, or the like.

Additionally, the metal hydrate (b) which surface is treated with, for example a silane coupling agent may be used. A method of treating the surface of the metal hydrate (b) with the silane coupling agent is not particularly limited, and examples include a method wherein the silane coupling agent is dissolved in a solvent such as acetone, ethyl acetate or toluene, the resulting solution is sprayed or applied on the surface of the metal hydrate (b), and the surface is dried to remove the solvent.

In order to achieve the object of this invention, a ratio of polylactic acid resin (a) to metal hydrate (b) in the polylactic acid resin composition, that is, polylactic acid resin (a)/metal hydrate (b) is preferably 40/60-80/20, more preferably 40/60-70/30, as a mass ratio.

[Phosphazene Derivative (c)]

According to this invention, a phosphazene derivative (c) is used as a phosphoruos compound. The phosphazene derivative (c) is not particularly limited, but one selected from the group consisting of polyphosphazene compounds, cyclophosphazene compounds, phenoxycyclophosphazene compounds, cyclophosphazene compounds having cyanophenoxy groups, cyclophosphazene compounds having aminophenoxy groups, cyclophenoxyphosphazene compounds having naphthoxy groups, and cyclophosphazene compounds having phenolic hydroxyl groups, or a mixture thereof are preferred. Among these, phosphazene compounds having no phenolic hydroxyl groups are preferred, because these phenolic hydroxyl groups can easily form quinone structures which cause coloration due to oxidation. Thus, phenoxycyclophosphazene compounds, cyclophosphazene compounds having cyanophenoxy groups, cyclophosphazene compounds having aminophenoxy groups, or cyclophenoxyphosphazene compounds having naphthoxy groups are especially preferred, and they have excellent discoloaration-resistance.

In order to achieve the object of this invention, a content of phosphazene derivative (c) in a polylactic acid resin composition is preferably 1-30 parts by mass, even more preferably 2-20 parts by mass with respect to 100 parts by mass of polylactic acid resin. If the content is less than 1 part by mass, sufficient fire retardancy may not be obtained. If the content exceeds 30 parts by mass, sufficient bleed-resistance may not be obtained.

[Organic Crystal Nucleating Agent]

According to this invention, preferably the polylactic acid resin composition may contain additionally an organic crystal nucleating agent. The organic crystal nucleating agent includes amides such as fatty acid mono-amide, fatty acid bis-amide, aromatic carboxylic acid amide, rosin acid amide; hydroxy fatty acid esters; metal salts such as metal salts of aromatic sulphonic acid dialkyl ester, metal salts of phenylphosphonic acid, metal salts of phosphoric ester, metal salts of rosin acid; carbohydrazides; N-substituted ureas; organic pigments; or the like. For molding ability, heat-resistance and impact-resistance of the polylactic acid resin composition, as well as blooming-resistance of an organic crystal nucleating agent, at least one selected from the group consisting of compounds having one or more hydroxyl groups and one or more amide groups in a molecular and hydroxy fatty acid esters are preferred. In addition, the use of at least one selected from the group consisting of compounds having one or more hydroxyl groups and one or more amide groups in a molecular and hydroxy fatty acid esters in combination with a metal salt of phenylphosphonic acid is more preferred, and the use of a compound having one or more hydroxyl groups and one or more amide groups in a molecular in combination with a metal salt of phenylphosphonic acid is even more preferred.

In order to enhance compatibility with polylactic acid resins, as compounds having one or more hydroxyl groups and one or more amide groups in a molecular, aliphatic amides having two or more hydroxyl groups and two or more amide groups are preferred. Furthermore, a melting point of the compounds having one or more hydroxyl groups and one or more amide groups in a molecular is preferably 65° C. or higher, more preferably 70-220° C., even more preferably 80-190° C., in order to enhance the dispersion of the organic crystal nucleating agent upon kneading and to increase the crystallization rate of the polylactic acid resin composition.

The compounds having one or more hydroxyl groups and one or more amide groups in a molecular include hydroxy fatty acid mono-amides such as 12-hydroxy stearic acid mono-ethanol-amide; hydroxy fatty acid bis-amides such as methylene bis-12-hydroxy stearic acid amide, ethylene bis-12-hydroxy stearic acid amide, or hexamethylene bis-12-hydroxy stearic acid amide; or the like. For molding ability, heat-resistance, impact-resistance and blooming-resistance of the polylactic acid resin composition, alkylene bis-hydroxy stearic acid amides such as methylene bis-12-hydroxy stearic acid amide, ethylene bis-12-hydroxy stearic acid amide, or hexamethylene bis-12-hydroxy stearic acid amide are preferred, and ethylene bis-12-hydroxy stearic acid amide is more preferred.

The hydroxy fatty acid esters include 12-hydroxy stearic acid triglyceride, 12-hydroxy stearic acid diglyceride, 12-hydroxy stearic acid monoglyceride, pentaerythritol mono-12-hydroxy stearate, penta-erythritol di-12-hydroxy stearate, pentaerythritol tri-12-hydroxy stearate or the like. For molding ability, heat-resistance and impact-resistance of the polylactic acid resin composition, as well as blooming-resistance of the organic crystal nucleating agent, 12-hydroxy stearic acid triglyceride is preferred.

Metal salts of phenyl phosphonic acid are metal salts of phenyl phosphonic acid having a phenyl group which may have substituents and a phosphone group ($-PO(OH)_2$). The substituents of the phenyl group include alkyl groups having 1-10 carbon atoms, alkoxycarbonyl groups having 1-10 carbon atoms in alkoxy group, or the like. Examples of the phenyl phosphonic acids include unsubstituted phenyl phosphonic acid, methylphenyl phosphonic acid, ethylphenyl phosphonic acid, propylphenyl phosphonic acids, butylphenyl phosphonic acid, dimethoxycarbonylphenyl phosphonic acid, diethoxycarbonylphenyl phosphonic acid, or the like, and unsubstituted phenyl phosphonic acid is preferred.

Metal salts of the phenyl phosphonic acid include salts of lithium, sodium, magnesium, aluminum, potassium, calcium, barium, copper, zinc, iron, cobalt, nickel, or the like, and zinc salt is preferred.

In order to achieve sufficient impact-resistance and flexibility, a content of organic crystal nucleating agent in the polylactic acid resin composition is preferably 0.05-5 parts by mass, more preferably 0.1-3 parts by mass, even more preferably 0.2-2 parts by mass with respect to 100 parts by mass of the polylactic acid resin.

[Inorganic Filler]

The polylactic acid resin composition of this invention may contain additionally an inorganic filler. The inorganic filler includes silicates such as talc, smectite, kaolin, mica, montmorillonite, or the like; inorganic compounds such as silica, magnesium oxide, titanium oxide, calcium carbonate, or the like; fibrous inorganic fillers such as glass fiber, carbon fiber, graphite fiber, wollastonite, potassium titanate whisker, silicon-based whisker, or the like. For molding ability and heat-resistance of the polylactic acid resin composition, among these, silicate is preferred, talc or mica is more preferred, and talc is especially preferred. In addition, for molding ability and transparency of the polylactic acid resin composition, silica is preferred.

In order to achieve good dispersion, an average particle size of inorganic filler is preferably 0.1-20 μm, more preferably 0.1-10 μm. Also, in order to enhance rigidity, an aspect ratio of fibrous inorganic filler is preferably at least 5, more preferably 10 or more, even more preferably 20 or more. The average particle size of inorganic filler may be determined by measuring a volume median diameter by a diffraction/scattering method. Commercially available apparatuses include SALD-3100 manufactured by SHIMADZU CORPORATION, which is a laser diffraction-type particle size distribution measuring device.

In order to achieve sufficient heat-resistance and impact-resistance, a content of inorganic filler in the polylactic acid resin composition is preferably 1-200 parts by mass, more preferably 3-50 parts by mass, even more preferably 5-40 parts by mass with respect to 100 parts by mass of polylactic acid resin.

[Agent for Inhibiting Hydrolysis]

The polylactic acid resin composition of this invention may contain additionally an agent for inhibiting hydrolysis. The agent for inhibiting hydrolysis includes carbo-diimide compounds, for example polycarbodiimide compounds or monocarbodiimide compounds. For molding ability of the polylactic acid resin composition, poly-carbodiimide compounds are preferred, and for heat-resistance and impact-resistance of the polylactic acid resin molded body, as well as blooming-resistance of an organic crystal nucleating agent from a molded body, monocarbodiimide compounds are preferred. Also, for durability of the polylactic acid resin molded body, a combination of polycarbodiimide compounds and monocarbodiimide compounds is preferred.

The polycarbodiimide compounds include poly(4,4'-diphenylmethanecarbodiimide), poly(4,4'-dicyclohexylmethanecarbodiimide), poly(1,3,5-triisopropylbenzene)polycarbodiimide, poly(1,3,5-triisopropylbenzene and 1,5-diisopropylbenzene)polycarbodiimide, or the like. The monocarbodiimide compounds include dicyclohexylcarbodiimide, diisopropylcarbodiimide, diphenylcarbodiimide, bis(methylphenyl)carbodiimide, bis(methoxyphenyl)carbodiimide, bis(nitrophenyl)carbodiimide, bis(dimethylphenyl)carbodiimide, bis(diisopropylphenyl)carbodiimide, bis(di-t-butyl)carbodiimide, N-ethyl-N'-(3-dimethylaminopropyl)carbodiimide, bis(triphenylsilyl)carbodiimide, N,N'-di-2,6-diisopropylphenylcarbodiimide, or the like. As poly(4,4'-dicyclohexylmethanecarbodiimide), CARBODILITE LA-1 (trade name of Nisshinbo Industries, Inc.) is commercially available for use. As poly(1,3,5-triisopropylbenzene)polycarbodiimide or poly(1,3,5-triisopropylbenzene and 1,5-diisopropylbenzene)polycarbodiimide, STABAXOL P or STABAXOL P-100 (both are trade name of Rhein Chemie) is commercially available for use. As N,N'-di-2,6-diisopropylphenylcarbodiimide, STABAXOL I or STABAXOL I-LF (both are trade name of Rhein Chemie) is commercially available for use.

In order to meet molding ability of the polylactic acid resin composition, heat-resistance and impact-resistance of the polylactic acid resin molded body, as well as blooming-resistance of the organic crystal nucleating agent, said carbodiimide compounds may be used alone or a combination of two or more compounds.

For molding ability of the polylactic acid resin composition, a content of agent for inhibiting hydrolysis in the polylactic acid resin composition is preferably 0.05-7 parts by mass, even more preferably 0.1-3 parts by mass with respect to 100 parts by mass of polylactic acid resin.

[Others]

In addition to the above-mentioned components, the polylactic acid resin composition of this invention may contain additionally other components such as hindered phenol or phosphite-based antioxidants, or lubricants such as hydrocarbon-based waxes or anionic surfactants. A content of each of antioxidant and lubricant is preferably 0.05-3 parts by mass, even more preferably 0.1-2 parts by mass with respect to 100 parts by mass of polylactic acid resin.

In addition to the above-mentioned components, the polylactic acid resin composition of this invention may contain additionally antistatic agents, antifogging agents, light stabilizers, ultraviolet absorbents, pigments, antifungal agents, antibacteria agents, foaming agents or the like in a range which do not adversely influence effects of this invention.

<Polylactic Acid Resin Molded Body and Method of Manufacturing the Same>

According to this invention, a polylactic acid resin molded body may be formed by molding the polylactic acid resin composition of this invention. For example, there is a method comprising: mixing a metal hydrate (b) having an alkali metal-containing substance content of not more than 0.2% by mass, a phosphazene derivative (c), and optionally an organic crystal nucleating agent or other additives while dissolving a polylactic acid resin (a) therein by an extruder, or the like, and filling the melt in a mold and molding it by an injection molding machine. In order to increase crystallization rate and to enhance workability, a temperature of the mold is not particularly limited, but it is preferably in the range from glass transition temperature of polylactic acid (a) to 110° C.

A preferable method for manufacturing polylactic acid resin molded body comprises the process of dissolving and kneading the polylactic acid resin (a), the metal hydrate (b) having the alkali metal-containing substance content of not more than 0.2% by mass and the phosphazene derivative (c) to obtain the melt of polylactic acid resin composition (hereinafter, it is referred to as process (1)), and the process of filling the melt obtained from said process (1) in a mold at a temperature in the range from glass transition temperature of polylactic acid resin (a) to 110° C. and molding it (hereinafter, it is referred to as process (2)). Also, a method comprising: carrying out the process (1), cooling, allowing to form amorphous phase (that is, a condition wherein the degree of crystallization measured by wide-angle X-ray diffraction is not more than 1%), followed by carrying out the process (2), or a method comprising: carrying out the process (1), cooling, immediately followed by carrying out the process (2) is preferred. In order to increase crystallization rate, the latter method comprising: carrying out the process (1), cooling, immediately followed by carrying out the process (2) is more preferred.

As an example of said process (2), here is a method wherein the polylactic acid resin composition is filled in a mold at a temperature in the range from glass transition temperature of polylactic acid resin (a) to 110° C. and is molded using an injection molding machine. In the process (2), a retention time in the mold is preferably 5-60 seconds, more preferably 8-50 seconds, even more preferably 10-45 seconds, in order to achieve the relative degree of crystallization of 60% and enhance producibility.

EXAMPLE

Examples 1~7, Comparative Examples 1~6

Pellets from polylactic acid resin composition were prepared by dissolving and kneading each component shown in Tables 1 and 2 at 190° C. with a twin screw extruder (the product by KURIMOTO, LTD.; trade name: Si kneader), and carrying out strand-cutting. The resulting pellets were dried at 70° C. under decompression for 1 day to make an amount of moisture to be 500 ppm or less.

TABLE 1

| | | Examples | | | | | | |
|---|---|---|---|---|---|---|---|---|
| | | 1 | 2 | 3 | 4 | 5 | 6 | 7 |
| Polylactic acid resin | H-400 | 50 | 55 | 53 | 52.5 | 55 | 55 | 55 |
| Aluminum hydroxide | BE033 | 44.5 | 39.5 | 44.5 | 44.5 | 34.5 | 34.5 | 39.5 |
| Glass fiber | FT689 | | | | | 5 | | |
| Antidrip agent | FA-500 | 0.5 | 0.5 | 0.5 | 0.5 | 0.5 | 0.5 | 0.5 |

TABLE 1-continued

| | | Examples | | | | | | |
|---|---|---|---|---|---|---|---|---|
| | | 1 | 2 | 3 | 4 | 5 | 6 | 7 |
| Phosphazene derivative | SPS-100 | 5 | 5 | 2 | 2.5 | 5 | 10 | |
| Phosphazene derivative | SPH-100 | | | | | | | 5 |
| Bleed-resistance (60° C. × 95RH % × 6 h) | | ○ | ○ | ○ | ○ | ○ | ○ | ○ |
| Bleed-resistance (60° C. × 95RH % × 60 h) | | Δ | Δ | ○ | ○ | Δ | No evaluation | No evaluation |
| Molecular weight variation before/after Kneading (resin temperature 190° C.) | | ○ | ○ | ○ | ○ | ○ | ○ | ○ |
| Fire retardancy 1.6 mm | | V-0 | V-0 | V-0 | V-0 | V-0 | V-0 | V-0 |

TABLE 2

| | | Comparative examples | | | | | |
|---|---|---|---|---|---|---|---|
| | | 1 | 2 | 3 | 4 | 5 | 6 |
| Polylactic acid resin | H-100 | 55 | 55 | 55 | 55 | 55 | 55 |
| Aluminum hydroxide | BE033 | 39.5 | 39.5 | 39.5 | | | |
| Aluminum hydroxide | B1403 | | | | 39.5 | 39.5 | 39.5 |
| Polytetrafluorethylene | PTFE | 0.5 | 0.5 | 0.5 | 0.5 | 0.5 | 0.5 |
| Bisphenol A bis(diphenylphosphate) | BAPP | 5 | | | 5 | | |
| Organic phosphate | OP935 | | 5 | | | 5 | |
| Condensed phosphoric acid ester | PX-200 | | | 5 | | | 5 |
| Bleed-resistance (60° C. × 95RH % × 6 h) | | X | ○ | X | X | X | X |
| Molecular weight variation before/after Kneading (resin temperature 190° C.) | | X | XX | X | XX | XX | XX |
| Fire retardancy 1.6 mm | | NOT | NOT | V-0 | NOT | NOT | V-1 |

In Tables 1 and 2, abbreviated names have the following meanings.

"H-400": Polylactic acid resin produced by Mitsui Chemicals, Inc.; trade name: LACEA H-400, weight-average molecular weight (Mw): 210,000, the degree of dispersion (Mw/Mn)=3.2, L-body/D-body=98.2/1.8, melting point: 165° C., glass transition temperature: 57° C.

"H-100": Polylactic acid resin produced by Mitsui Chemicals, Inc.; trade name: LACEA H-100, weight-average molecular weight (Mw): 140,000, the degree of dispersion (Mw/Mn)=3.4, L-body/D-body=98.3/1.7, melting point: 168° C., glass transition temperature: 57° C.

"BE033": Aluminum hydroxide produced by Nippon Light Metal Co., Ltd.; trade name: BE033, average particle size: 2 μm, the content of alkali metal-containing substance $Na_2O$: 0.01% by mass "B1403": Aluminum hydroxide produced by Nippon Light Metal Co., Ltd.; trade name: B1403, average particle size: 2 μm, the content of alkali metal-based substance $Na_2O$: 0.3% by mass "FT689": Glass fiber produced by Owens Corning Corporation; trade name: FT689, 10 μm diameter, 3 mm length "FA-500": Antidrip agent produced by Daikin Industries, Ltd.; trade name: POLYFLON MPA FA-500

"SPS-100": Phenoxycyclophosphazene compound produced by Otsuka Chemical Co., Ltd.; trade name: SPS-100

"SPH-100": Cyclophosphazene compound having phenolic hydroxyl group produced by Otsuka Chemical Co., Ltd.; trade name: SPH-100

"BAPP": Bisphenol A bis(diphenyl phosphate) produced by Ajinomoto Fine-Techno Co., Inc.; trade name: REOFOS BAPP "OP935": Organic phosphate produced by Clariant K. K.; trade name: EXOLIT O P935)

"PX-200": Condensed phosphoric acid ester produced by Daihachi Chemical Industry Co., Ltd.; trade name: PX-200

Next, test pieces in the form of plates (125 mm×12 mm×1.6 mm) were molded from pellets of polylactic acid resin composition using an injection molding machine produced by Toshiba Machine Co., Ltd.; trade name: EC20P at injector temperature of 200° C., mold surface temperature of room temperature (about 25° C.) and molding time of 1 minute. These test pieces were stored in drier at 100° C. for 4 hours to complete crystallization and subsequently physical properties were assessed. The results are shown in Tables 1 and 2.

<Bleed-Resistance>

After the test specimens were stored in a thermo-hygrostat set at 60° C.×95 RH % for 6 hours or 60 hours, bleed-resistance was assessed by observing a bleeding or precipitating component on a surface of the molded body by an optic microscope. The following criteria were used: the case where no bleeding component is observed is excellent (O), the case where a bleeding component is partially observed is good (Δ), both cases are success, and the case where a bleeding component is entirely observed is failure (x).

<Molecular Weight Retention Rate>

Pellets of polylactic acid resin composition were dissolved in chloroform, and a weight-average molecular weight (Mw) as that of after kneading the polylactic acid resin composition was determined in terms of polystyrene value. A weight-average molecular weight (Mw) of polylactic acids prior to kneading was determined by the same method. A molecular weight retention rate was determined by comparing the weight-average molecular weight (Mw) of polylactic acids after kneading with that of polylactic acids prior to kneading. The following criteria were used: the case where the molecular weight retention rate is 90% or more is good (O), the case where said value is from 80% to less than 90% is not good (x), and the case where said value is less than 80% is bad (xx).

<Fire Retardancy>

Fire retardancy of the test specimens was measured by UL standard vertical flame test (UL94V). Sequentially V-0, V-1, V-2 or NOT was designated in descending order according to fire retardancy.

From the results of Table 1, polylactic acid resin compositions (Examples 1~7) containing polylactic acid resins, metal hydrates having the alkali metal-containing substance content of not more than 0.2% by mass, and phosphazene derivatives had excellent bleed-resistance and molecular weight retention rate. However, polylactic acid resin compositions (Comparative examples 1~6) using common phosphorous compounds other than phosphazene derivatives had insufficient bleed-resistance and molecular weight retention rate. In addition, from the results of Table 2, polylactic acid resin compositions (Comparative examples 4~6) using metal hydrates having the alkali metal-containing substance content of greater than 0.2% by mass had much lower bleed-resistance and molecular weight retention rate.

From the above results, it is demonstrated that the polylactic acid resin compositions containing the polylactic acid resin (a), the metal hydrate (b) having the alkali metal-containing substance content of not more than 0.2% by mass, and the phosphazene derivative (c) show excellent bleed-resistance and molecular weight retention ratio.

This application claims the priority to Japanese patent application No. 2008-180139, filed on Jul. 10, 2008, which application is herein incorporated by reference in its entirety.

The invention claimed is:

1. A polylactic acid resin composition containing a polylactic acid resin (a), a metal hydrate (b) having an alkali metal-containing substance content of not more than 0.2% by mass, and a phosphazene derivative (c),
    wherein said metal hydrate (b) is aluminum hydrate,
    wherein said phosphazene derivative (c) primarily comprises a cyclophosophazene compound having a phenoxy group,
    wherein said polylactic acid resin (a) comprises a copolymer of L-lactic acid and D-lactic acid, and wherein a weight-average molecular weight of said polylactic acid resin (a) is more than 100,000, and
    wherein a mass ratio of said polylactic acid resin (a) to said metal hydrate(b), expressed as (a)/(b), is 52.5/44.5 to 53/44.5, and a mass ratio of said polylactic acid resin (a) to said phosphazene derivative (c), expressed as (a)/(c), is 53/2 to 52.5/2.5.

2. The polylactic acid resin composition according to claim 1, wherein a content of said phosphazene derivative (c) is 3.7-4.8 parts by mass with respect to 100 parts by mass of said polylactic acid resin (a).

3. The polylactic acid resin composition according to claim 1, wherein a weight-average molecular weight of said polylactic acid resin (a) is from 140,000 to 210,000.

4. The polylactic acid resin composition according to claim 1, further comprising an agent for inhibiting hydrolysis in a content of 0.05-7 parts by mass with respect to 100 parts by mass of the polylactic acid resin (a).

5. The polylactic acid resin composition according to claim 4, wherein the agent for inhibiting hydrolysis is selected from the group consisting of a polycarbodiimide compound and a monocarbodiimide compound.

6. The polylactic acid resin composition according to claim 1, further comprising an antidrip agent.

7. The polylactic acid resin composition according to claim 6, wherein the antidrip agent comprises polytetrafluoroethylene.

8. The polylactic acid resin composition according to claim 1, further comprising an inorganic filler in a content of 3-50 parts by mass with respect to 100 parts by mass of the polylactic acid resin (a).

9. The polylactic acid resin composition according to claim 8, wherein the inorganic filler comprises silica.

10. The polylactic acid resin composition according to claim 8, wherein the inorganic filler comprises glass fiber.

11. A polylactic acid resin molded body formed by molding the polylactic acid resin composition of claim 1.

12. A method for manufacturing a polylactic acid resin molded body comprising:
    (1) a process of dissolving and kneading a polylactic acid resin (a), a metal hydrate (b) having an alkali metal-containing substance content of not more than 0.2% by mass and a phosphazene derivative (c), wherein a mass ratio of said polylactic acid resin (a) to said metal hydrate (b), expressed as (a)/(b), is 52.5/44.5 to 53/44.5, and a mass ratio of said polylactic acid resin (a) to said phosphazene derivative (c), expressed as (a)/(c), is 53/2 to 52.5/2.5, wherein said polylactic acid resin (a) comprises a copolymer of L-lactic acid and D-lactic acid, and wherein a weight-average molecular weight of said polylactic acid resin (a) is more than 100,000, and wherein said metal hydrate (b) is aluminum hydrate, to obtain a melt of a polylactic acid resin composition, and
    (2) a process of filling said melt in a mold at temperature in the range from glass transition temperature of said polylactic acid resin (a) to 110° C. and molding it.

13. A polylactic acid resin composition containing a polylactic acid resin (a), a metal hydrate (b) having an alkali metal-containing substance content of not more than 0.2% by mass, and a phosphazene derivative (c),
    wherein said metal hydrate (b) is aluminum hydrate,
    wherein said phosphazene derivative (c) primarily comprises a cyclophosphazene compound having phenoxy group,
    wherein a weight-average molecular weight of said polylactic resin (a) is more than 100,000, and
    wherein a mass ratio of said polylactic acid resin (a) to said metal hydrate (b), expressed as (a)/(b), is 52.5/44.5 to 53/44.5, and a mass ratio of said polylactic acid resin (a) to said phosphazene derivative (c), expressed as (a)/(c), is 53/2 to 52.5/2.5.

14. A method for manufacturing a polylactic acid resin molded body comprising:
    (1) a process of dissolving and kneading a polylactic acid resin (a), a metal hydrate (b) having an alkali metal-containing substance content of not more than 0.2% by mass and a phosphazene derivative (c), wherein a mass ratio of said polylactic acid resin (a) to said metal hydrate (b), expressed as (a)/(b), is 52.5/44.5 to 53/44.5, and a mass ratio of said polylactic acid resin (a) to said phosphazene derivative (c), expressed as (a)/(c) is 53/2 to 52.5/2.5, wherein a weight-average molecular weight of said polylactic acid resin (a) is more than 100,000, and wherein said metal hydrate (b) is aluminum hydrate, to obtain a melt of a polylactic acid resin composition, and (2) a process of filling said melt in a mold at temperature in the range from glass transition temperature of said polylactic acid resin (a) to 110° C. and molding it.

* * * * *